United States Patent
Fu et al.

(10) Patent No.: US 10,749,812 B2
(45) Date of Patent: Aug. 18, 2020

(54) DYNAMIC NETWORK FLOWS SCHEDULING SCHEME IN DATA CENTER

(71) Applicant: SHANGHAI JIAO TONG UNIVERSITY, Shanghai (CN)

(72) Inventors: Zhouwang Fu, Shanghai (CN); Tao Song, Shanghai (CN); Haibing Guan, Shanghai (CN); Zhengwei Qi, Shanghai (CN); Ruhui Ma, Shanghai (CN); Jianguo Yao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 205 days.

(21) Appl. No.: 15/749,504

(22) PCT Filed: Jun. 21, 2016

(86) PCT No.: PCT/CN2016/086543
§ 371 (c)(1),
(2) Date: Nov. 30, 2018

(87) PCT Pub. No.: WO2017/032157
PCT Pub. Date: Mar. 2, 2017

(65) Prior Publication Data
US 2019/0089645 A1 Mar. 21, 2019

(30) Foreign Application Priority Data
Aug. 25, 2015 (CN) .......................... 2015 1 0526867

(51) Int. Cl.
*H04L 12/873* (2013.01)
*H04L 12/865* (2013.01)
(Continued)

(52) U.S. Cl.
CPC ............ *H04L 47/52* (2013.01); *H04L 41/083* (2013.01); *H04L 43/10* (2013.01); *H04L 47/11* (2013.01);
(Continued)

(58) Field of Classification Search
CPC ....... H04L 47/52; H04L 47/11; H04L 47/193; H04L 47/28; H04L 47/6275;
(Continued)

(56) References Cited

U.S. PATENT DOCUMENTS

| 6,721,273 B1 * | 4/2004 | Lyon | ..................... H04L 49/255 370/235 |
| 2016/0173383 A1 * | 6/2016 | Liu | ......................... H04L 47/30 370/235 |

* cited by examiner

*Primary Examiner* — Azizul Choudhury

(57) ABSTRACT

The present invention relates to Data Center Network (DCN) flow scheduling scheme. It provides a dynamic scheduling algorithm and a hybrid of centralized and decentralized scheduling system to improve the performance of DCN and data parallel application. The scheduling system uses a central controller to collect the real-time bandwidth of each node, and schedule the priority as well as transmission rate of each network flow set combined by application context (Coflow [1]). The centralized scheduling avoids a sophisticated system design and hardware (switch) modification to comparing with full decentralized solutions. The combination of centralization and decentralization decreases the average completion time of Coflows, and eventually improve the performance of data parallel applications.

1 Claim, 3 Drawing Sheets

(51) Int. Cl.
*H04L 12/841* (2013.01)
*H04L 12/801* (2013.01)
*H04L 12/26* (2006.01)
*H04L 12/24* (2006.01)

(52) U.S. Cl.
CPC ............ *H04L 47/193* (2013.01); *H04L 47/28* (2013.01); *H04L 47/6275* (2013.01); *H04L 43/0876* (2013.01); *H04L 43/0894* (2013.01); *Y02D 50/30* (2018.01)

(58) Field of Classification Search
CPC ... H04L 41/083; H04L 43/10; H04L 43/0876; H04L 43/0894; Y02D 50/30
See application file for complete search history.

DYNAMIC NETWORK FLOWS SCHEDULING SCHEME IN DATA CENTER

CROSS REFERENCE OF RELATED APPLICATION

This is a U.S. National Stage under 35 U.S.C 371 of the International Application PCT/CN2016/086543, filed Jun. 21, 2016, which claims priority under 35 U.S.C. 119(a-d) to CN201510526867.5, filed Aug. 25, 2015.

BACKGROUND OF THE PRESENT INVENTION

Field of Invention

This invention is proposed in the field of flow scheduling in Data Center Network of Computer Science. Specifically, this invention leverages a dynamic scheduling scheme with real-time network and flow information on Coflow [1] scheduling to improve the performance of distributed data parallel computing system.

Description of Related Arts

Cloud computing has become a milestone of the IT industry. Though it has evolved for a long time, it is still a hotspot in both research area and industry field. Meanwhile, numbers of sophisticated distributed data parallel computing frameworks are proposed and deployed in modern data center upon the cloud computing infrastructure. Unfortunately, most of these computing systems are designed for a general environment, thus resulting in a neglect of characteristics of data center infrastructure. This opaque hurts the performance of computing frameworks and even the whole infrastructure in the cloud, especially the network. A data parallel computing application produces hundreds of gigabytes on the network while running in a cluster. The network traffics bring huge challenges to data center network management.

Much research work has been proposed in the field of data center network to eliminate the bottleneck of network transfer in the distributed data parallel computing. Most of the researches focus on optimizing the performance of single network flow. Some of them reduce the average flow completion time (FCT) and increase the throughput without the sophisticated modification of hardware switches. But in the context of data parallel computing, the successive computing phases has the data dependency of numbers. The successive computing phases unable to start until all of the to flows are finished. In other word, optimizing the completion time of the set of the flows is critical, instead of reducing the average FCT.

According to this observation, a conception of Coflow [1] is proposed by researchers from University of California, Berkeley. The Coflow refers to a set of network flows which are combined by the context of data parallel application. For example, all the flows of a shuffle between a MapReduce [1] computing belong to a Coflow. Many researches have been proposed base on the Coflow concept. Some of them leverage a centralized system to collect and manage the Coflows (e.g., Varys [2]). But the centralized system is based on the static configuration in the data center, which is not practical in the public data center where the hardware resources are shared. Other researches schedule the Coflows in a distributed way (e.g., Baraat [3]). But the proposed distributed schemes need sophisticated hardware switch modifications.

SUMMARY OF THE PRESENT INVENTION

According to the concept of Coflow, this invention introduces a dynamic scheduling algorithm and a hybrid of centralized and decentralized system to optimize the performance of data center network under distributed data parallel computing. The centralized controller provides an easy deployment without hardware modifications. At the same time, the dynamic bandwidth collection and the distributed flow rate controller address the dilemma in conventional centralized schemes and provide a real-time precise management of Coflows. In summary, the invention provides (1), a precise scheduling of Coflows and flows (2), a faster average Coflow completion time.

As showed in FIG. 1, the system architecture of the invention is presented with the Hadoop cluster (Hadoop is a representative of distributed data parallel computing framework). The invention designates one node as the master node, and others as slave nodes. The daemon process is deployed on each slave node to monitor the real-time remaining bandwidth and send heartbeat to master node periodically.

Base on the system architecture, the invention introduces a dynamic algorithm which contains following steps:

1 Master node collects the heartbeat message from slave nodes periodically, fetches the remaining bandwidth of each slave node and stores them in the local memory.

2 Before a set of flows start in the distributed data parallel frameworks, a Coflow register request will be sent through the interface provided by daemon process on the slave node. This request contains the number of flows, the sender and receiver node of each flow.

3 Master assigns a unique integer ID to the Coflow in the received request. The ID will be broadcasted to each sender and receiver of the flows in this Coflow.

4 A sender sends a 'put' request to the master node with the corresponding Coflow ID before a flow is ready. A receiver sends a 'get' request to the master with the corresponding Coflow ID before the receiver is ready to accept a flow.

5 A Coflow is put to the scheduling queue only after all the 'put' and 'get' requests of each flow of this Coflow are committed. When all flows of a Coflow are finished, this Coflow will be removed from the scheduling queue.

6 A scheduling is triggered when (1), a Coflow is ready to be transferred, (2), a Coflow is finished, (3), a fluctuation of remaining bandwidth of a node is detected in the heartbeat message, which exceeds the threshold. The threshold is configurable.

7 In a Coflows scheduling, the master node first calculates the slowest FCT of all Coflows in the scheduling queue according to the cached remaining bandwidth of each node. The master node than sorts the Coflows according to the slowest FCT ascendingly. The slowest FCT of each Coflow is also the approximate Coflow completion time (CCT). The master marks the Coflow having shortest CCT with the highest priority.

8 For the highest priority Coflow, the master node marks the network link of the slowest flow exclusive. The master node then slows down other flows in that Coflow to until the FCTs of them equal the slowest FCT. The extra bandwidth of these links is able to be shared with other Coflows having lower priorities. The priorities and the transmission rate will be broadcasted to every slave node after a scheduling.

9 To avoid the transmission of Coflows with lower priorities hurting the higher ones, the slave node controls the transmission rate of these Coflows according to the explicit congestion notification (ECN) signal. When the slave node detects the congestion on a network link, the slave node slows down the Coflows with lower priorities. On the other hand, the slave node increases the transmission rate of the Coflows with lower priorities. The transmission rate is controlled by the following formula. 'α' refers to the adjustment parameter, 'F' refers to the number of packets with congestion flag (CE) in current TCP congestion window, 'Speed' refers to the transmission rate of a flow.

DETAILED DESCRIPTION OF THE PREFERRED EMBODIMENT

An embodiment of this invention will be elaborated in this section. This embodiment is based on the design and algorithms of the invention. The detail methodologies and operations will be presented. The application of this invention is not limited by the environment of this embodiment. The invention is able to be applied in any distributed data parallel computing frameworks as long as the corresponding interfaces are implemented according to the standard Coflow application programming interfaces (APIs).

The cluster of this embodiment contains five Dell servers and one Dell switch. The server model is Dell PowerEdge R710. Each of the server has two Intel Xeon X5660 2.8 GHz CPUs, 96 GB memory, two 60 GB disks, and a Broadcom 5709C Dual Port Server Ethernet Gigabit PCI-Express network interface card. The Ubuntu Server 14.04.1 LTS 64 bit is installed on each server.

Figure 1:
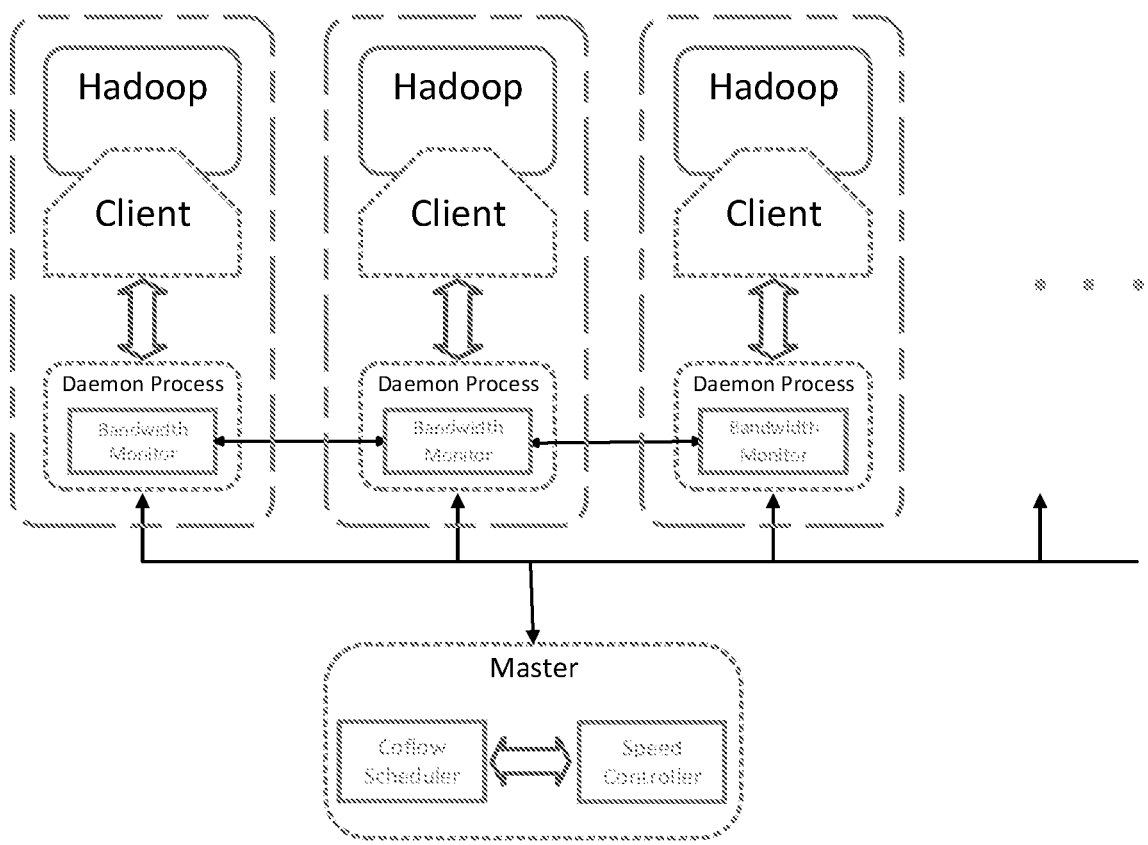
FIG. 1 is an illustration of a system architecture of the present invention
Figure 2:
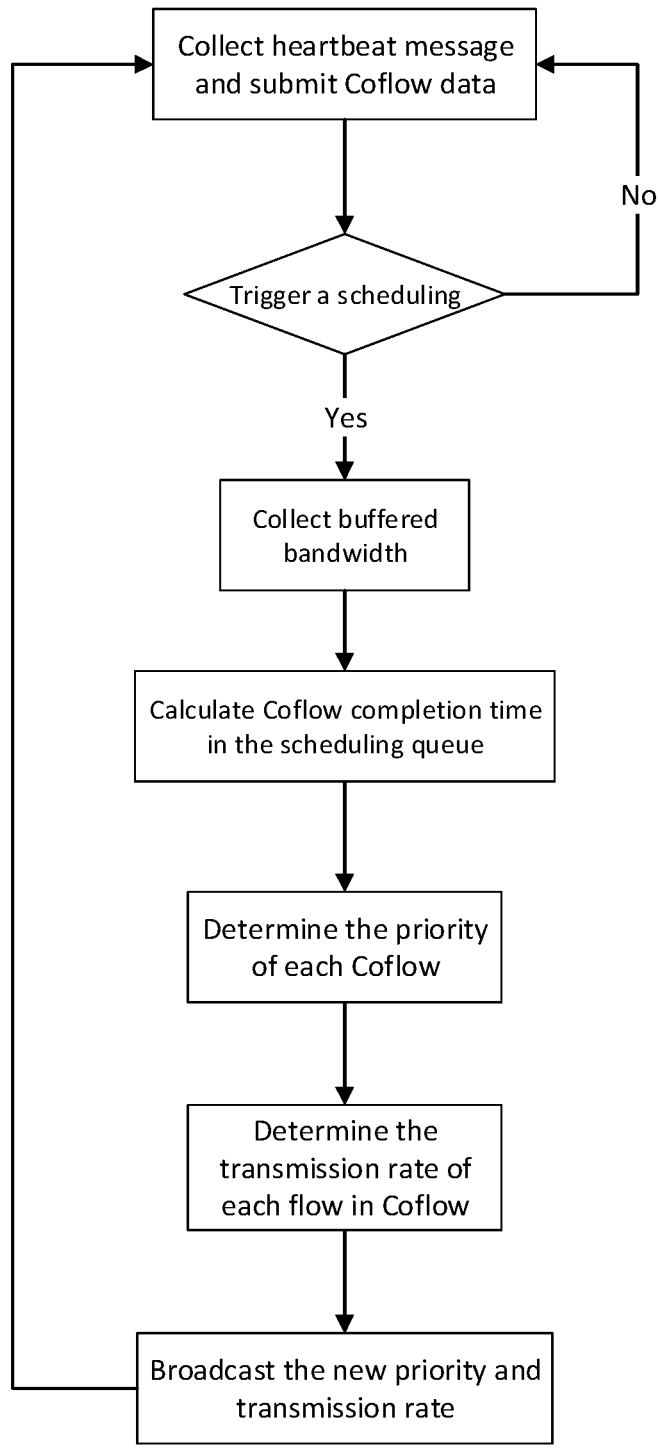
FIG. 2 is an algorithm flow chart of a master node
Figure 3:
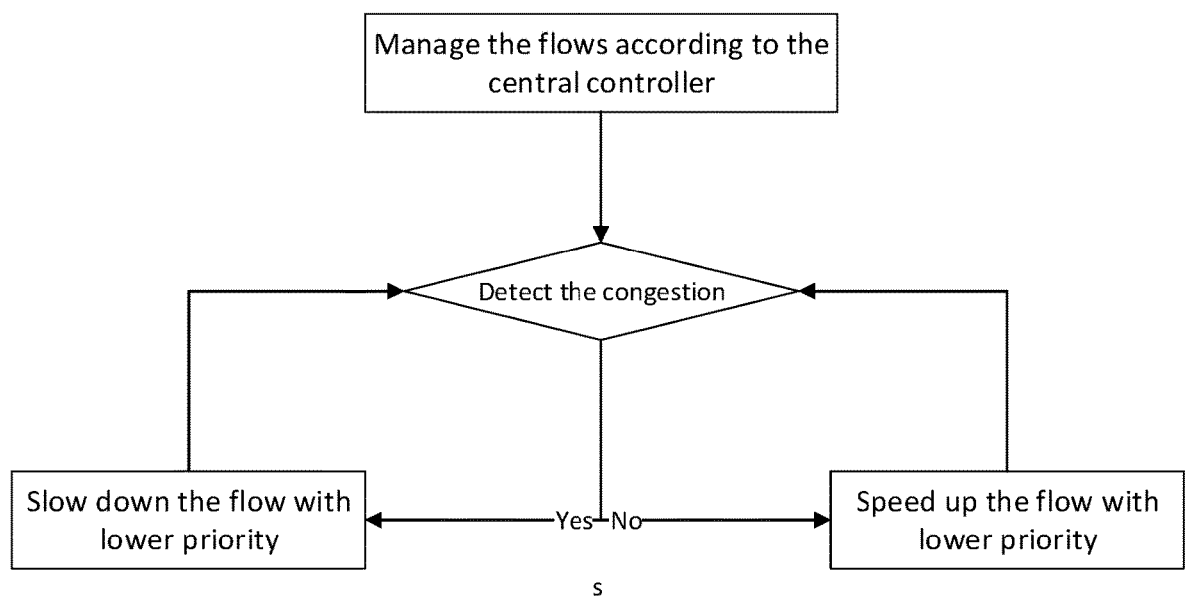
FIG. 3 is a rate control algorithm flow chart of a slave node

One of the servers is designated as the master node. The Coflow scheduling component and rate control component are installed on the master. The Coflow scheduling component working procedure is presented in FIG. 2. When the Coflow scheduling component is triggered, it first reads the remaining bandwidth of each node from the rate control component. Then it calculates the completion time and transmission rate of each Coflow, sorts them ascendingly, and marks the Coflows having shorter completion time with higher priorities. The priorities and the transmission rate will be broadcasted to other four slave nodes after a scheduling.

The other four nodes are designated as slave nodes. A client process is deployed on each slave node. The client process provides the standard Coflow APIs to connect a modified Hadoop client. Besides, a daemon process is deployed on each slave node to (1), keep connection with master, (2), monitor and report the real-time remaining bandwidth to master node periodically, (3), manage the transmission rate of Coflows with lower priorities dynamically.

In this embodiment, the Hadoop MapReduce generates the corresponding Coflow parameters during the runtime. The parameters are used as the input data for the evaluation. The evaluation results show that the invention is able to provide 1.7 times speedup of average Calm completion time comparing with the centralized static schemes. In addition, the invention increases the precision of scheduling Coflows with to deadlines restrictions. The invention is more precise than the centralized static schemes by 1.1 times.

Many features and advantages of the present invention are apparent from the written description, and thus, it is intended by the appended claims to cover all such features and advantages of the invention. Further, since numerous modifications and changes readily occur to those skilled in the art, it is not desired to limit the invention to the exact construction and operation as illustrated and described. Hence, all suitable modifications and equivalents may be resorted to as falling within the scope of the invention.

What is claimed is:

1. A method for network flow scheduling in a data center network, comprising steps of:

step 1: collecting a heartbeat message from slave nodes periodically by a master node; fetching a remaining bandwidth of each of the slave nodes and storing the remaining bandwidth of each of the slave nodes in a local memory of the master node;

step 2: sending a Coflow register request through an interface provided by a daemon process on the slave nodes before a set of flows start in distributed data parallel frameworks; wherein the Coflow register request contains a number of flows, a sender and a receiver node of each of the flows;

step 3: assigning a unique integer ID to a Coflow in a received request by the master node; wherein the unique integer ID is broadcasted to each of sender nodes and receiver nodes of flows in the Coflow;

step 4: sending a 'put' request to the master node with a corresponding Coflow ID before a flow is ready by a sender; sending a 'get' request to the master node with the corresponding Coflow ID by a receiver before a receiver is ready to accept the flow;

step 5: putting the Coflow to a scheduling queue only after all 'put' and 'get' requests of each flow of the Coflow are committed; wherein when all flows of the Coflow are finished, the Coflow is removed from the scheduling queue;

step 6: triggering a scheduling when (1), the Coflow is ready to be transferred, (2), the Coflow is finished, (3), a fluctuation of the remaining bandwidth of a node is detected in the heartbeat message, which exceeds a threshold; wherein the threshold is configurable;

step 7: first calculating a slowest FCT (flow completion time) of all Coflows in the scheduling queue according to a cached remaining bandwidth of each of the slave node by the master node in a Coflows scheduling; sorting the Coflows according to a slowest FCT accordingly by the master node; wherein the slowest FCT of each Coflow is also a approximate Coflow completion time (CCT); the master node marks the Coflow having shortest CCT with a highest priority;

step 8: marking a network link of a slowest flow exclusive by the master node for a highest priority Coflow; wherein the network link slows down other flows in the Coflow until the FCTs of the other flows equal a slowest FCT; an extra bandwidth on the network link is able to be shared with Coflows which have lower priorities; priorities and a transmission rate is broadcasted to each of the slave nodes after a scheduling; and step 9: avoiding a transmission of the Coflows with lower priorities hurting the the Coflows with higher priorities; wherein the slave node controls a transmission rate of the Coflows according to an explicit congestion notification (ECN) signal; when the slave node detects a congestion on the network link, the slave node slows down the Coflows with the lower priorities; on the other hand, the slave node increases the transmission rate of the Coflows with the lower priorities; the transmission rate is controlled by a following formula: wherein 'α' refers to an adjustment parameter; 'F' refers to a number of packets with congestion flag (CE) in current TCP congestion window; 'Speed' refers to the transmission rate of a flow $$\alpha \leftarrow 0.5 \times \alpha + 0.5 \times F$$

$$\text{Speed} \leftarrow \begin{cases} \text{Speed} + 1, & \text{without } CE \\ \text{Speed} \times \left(1 - \frac{\alpha}{2}\right), & \text{with } CE \end{cases}.$$

* * * * *